United States Patent
Hu et al.

(10) Patent No.: US 12,554,300 B2
(45) Date of Patent: Feb. 17, 2026

(54) NEAR-EYE DISPLAY DEVICE

(71) Applicant: Coretronic Corporation, Hsin-Chu (TW)

(72) Inventors: Tung-Chou Hu, Hsin-Chu (TW); Wei-Min Chien, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 228 days.

(21) Appl. No.: 18/433,242

(22) Filed: Feb. 5, 2024

(65) Prior Publication Data

US 2024/0272687 A1 Aug. 15, 2024

(30) Foreign Application Priority Data

Feb. 14, 2023 (CN) .......................... 202310109172.1

(51) Int. Cl.
 *G06F 1/20* (2006.01)
 *G02B 27/01* (2006.01)

(52) U.S. Cl.
 CPC ......... *G06F 1/203* (2013.01); *G02B 27/0176* (2013.01); *G02B 2027/0178* (2013.01)

(58) Field of Classification Search
 CPC .............. G02B 27/017; G02B 27/0176; G02B 2027/0178; G02B 27/0172; G02B 2027/0138; G02B 6/0085; G02B 27/01; G02C 5/22; G06F 1/1681; G06F 2200/203; G06F 1/206; G06F 1/16; G06F 1/20; G06F 1/203; H05K 5/0226; H04N 13/344

See application file for complete search history.

(56) References Cited

U.S. PATENT DOCUMENTS

| | | | | |
|---|---|---|---|---|
| 8,016,415 B2* | 9/2011 | Figler | ..................... | G02C 7/101 |
| | | | | 351/158 |
| 8,979,259 B2* | 3/2015 | Haddock | .............. | G02C 5/2272 |
| | | | | 351/158 |
| 8,979,295 B2* | 3/2015 | Waters | ................... | A42B 1/242 |
| | | | | 351/158 |
| 9,740,023 B1* | 8/2017 | Ashwood | ............. | H05K 7/2039 |
| 10,534,203 B2* | 1/2020 | Olgun | ....................... | H04B 1/18 |
| 10,826,163 B2* | 11/2020 | Moore | ..................... | H01Q 9/42 |
| 11,137,621 B1* | 10/2021 | Castañeda | ................ | G02C 5/22 |
| 11,333,905 B2* | 5/2022 | Zhang | .................... | H01Q 21/28 |

(Continued)

FOREIGN PATENT DOCUMENTS

| | | |
|---|---|---|
| CN | 114236840 | 3/2022 |
| TW | 202144861 | 12/2021 |

*Primary Examiner* — Michael A Matey
(74) *Attorney, Agent, or Firm* — JCIPRNET

(57) ABSTRACT

A near-eye display device includes a main frame, a temple, an optical engine module, a first heat transfer plate, and a second heat transfer plate. The temple is pivotally connected to the main frame, and the optical engine module is disposed in the main frame. The first heat transfer plate is disposed in the main frame and connected to the optical engine module. The second heat transfer plate is disposed in the temple. The temple is adapted to be rotated relative to the main frame and switched between a folded state and an unfolded state. When the temple is in the folded state, the second heat transfer plate and the first heat transfer plate are separated from each other. When the temple is in the unfolded state, the second heat transfer plate is in contact with the first heat transfer plate.

20 Claims, 10 Drawing Sheets

(56) References Cited

U.S. PATENT DOCUMENTS

| | | | |
|---|---|---|---|
| 11,474,376 B2* | 10/2022 | Gui | H01Q 1/273 |
| 12,029,014 B2* | 7/2024 | Yoon | G06F 1/20 |
| 12,393,052 B1* | 8/2025 | Nikkhoo | G02C 5/22 |
| 2009/0303431 A1* | 12/2009 | Ifergan | G02C 5/2227 |
| | | | 351/153 |
| 2011/0249232 A1* | 10/2011 | Senatore | G02C 7/085 |
| | | | 351/153 |
| 2012/0262667 A1* | 10/2012 | Willey | G02C 5/14 |
| | | | 351/158 |
| 2016/0209659 A1* | 7/2016 | Nikkhoo | G02C 5/18 |
| 2016/0252727 A1* | 9/2016 | Mack | G02B 27/0172 |
| | | | 345/8 |
| 2016/0252728 A1* | 9/2016 | Mack | G09G 5/373 |
| | | | 351/158 |
| 2017/0343293 A1* | 11/2017 | Hurbi | F28F 21/087 |
| 2018/0074343 A1* | 3/2018 | Ashwood | A45C 11/04 |
| 2019/0369402 A1* | 12/2019 | Woodman | H04N 23/57 |
| 2020/0379257 A1* | 12/2020 | Lee | G02B 27/0176 |
| 2021/0055565 A1* | 2/2021 | Moore | G02C 11/10 |
| 2023/0059234 A1* | 2/2023 | Lee | G06F 1/1692 |
| 2023/0122743 A1* | 4/2023 | Lee | G06F 1/203 |
| | | | 361/707 |
| 2025/0130439 A1* | 4/2025 | Yliluoma | H01R 13/6205 |
| 2025/0189828 A1* | 6/2025 | Yliluoma | G02C 11/10 |

* cited by examiner

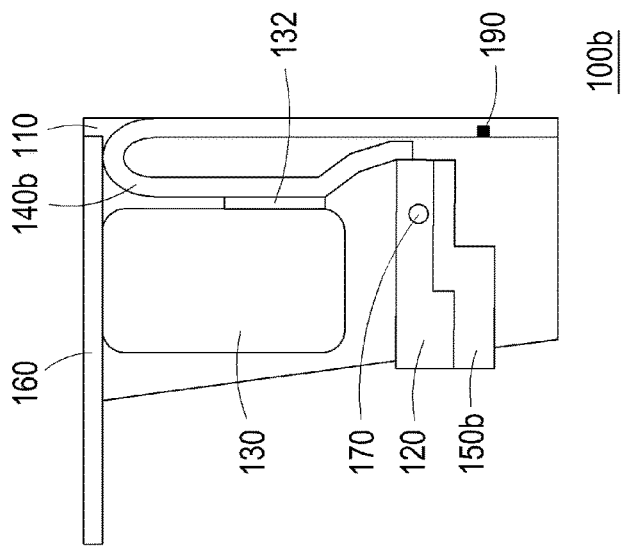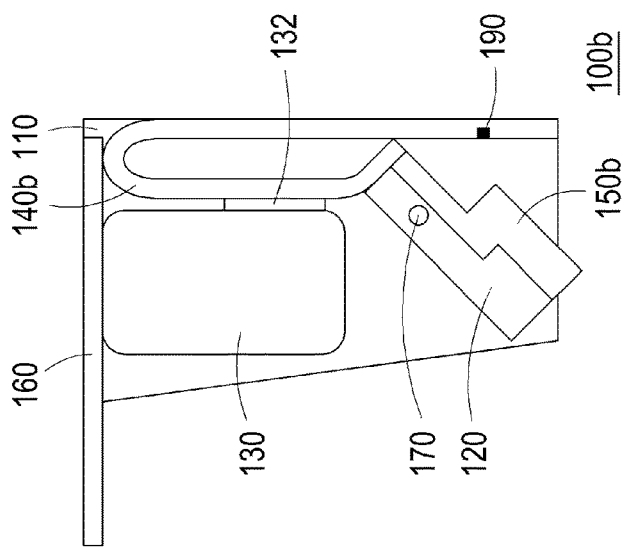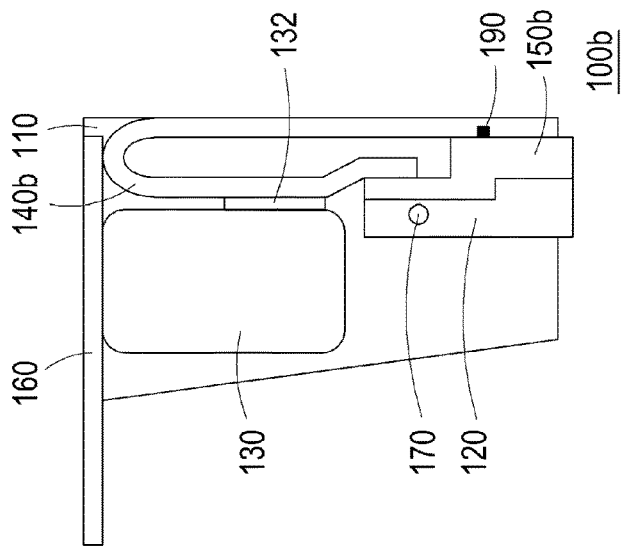

NEAR-EYE DISPLAY DEVICE

CROSS-REFERENCE TO RELATED APPLICATION

This application claims the priority benefit of China application serial no. 202310109172.1 filed on Feb. 14, 2023. The entirety of the above-mentioned patent application is hereby incorporated by reference herein and made a part of this specification.

BACKGROUND OF THE INVENTION

Field of the Invention

The invention relates to a display device, and in particular to a near-eye display device.

Description of Related Art

A general near-eye display device includes an optical engine module, and a beam forms an image in front of the eyes through a reflective light valve element. With the increase in brightness desired for images and limited by the miniaturization of products, poor heat dissipation has been an issue for the near-eye display device. The current heat dissipation structures often adopt a vapor chamber for heat dissipation, wherein one end is connected to the light source of the optical engine module, and another end is extended to the temple and attached to the temple to dissipate heat externally. However, the current near-eye display device has an issue about poor heat dissipation.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a near-eye display device having a good heat dissipation effect, wherein a temple may be folded, reliability is high, and costs may be lowered.

Other objects and advantages of the invention may be further understood from the technical features disclosed in the invention.

To achieve one or part or all of the above objects or other objects, an embodiment of the invention provides a near-eye display device including a main frame, a temple, an optical engine module, a first heat transfer plate, and a second heat transfer plate. The temple is pivotally connected to the main frame, and the optical engine module is disposed in the main frame. The first heat transfer plate is disposed in the main frame and connected to the optical engine module. The second heat transfer plate is disposed in the temple. The temple is adapted to be rotated relative to the main frame and switched between a folded state and an unfolded state. When the temple is in the folded state, the second heat transfer plate and the first heat transfer plate are separated from each other. When the temple is in the unfolded state, the second heat transfer plate is in contact with the first heat transfer plate.

Based on the above, the embodiments of the invention have at least one of the following advantages or functions. In the near-eye display device of an embodiment of the invention, when the temple is in the folded or unfolded state, the second heat transfer plate is separated from or in contact with the first heat transfer plate. Such a design may achieve a good heat dissipation effect when the temple is unfolded, and the temple may be folded, with high reliability and lower production cost.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 8A is a schematic partial top and perspective view of the near-eye display device of the sixth embodiment of the invention when the temple thereof is in the unfolded state.

FIG. 8B is a schematic partial top and perspective view of the near-eye display device of FIG. 8A during the rotation process of the temple thereof from the unfolded state to the folded state.

FIG. 8C is a schematic partial top and perspective view of the near-eye display device of FIG. 8A when the temple thereof is in the folded state.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
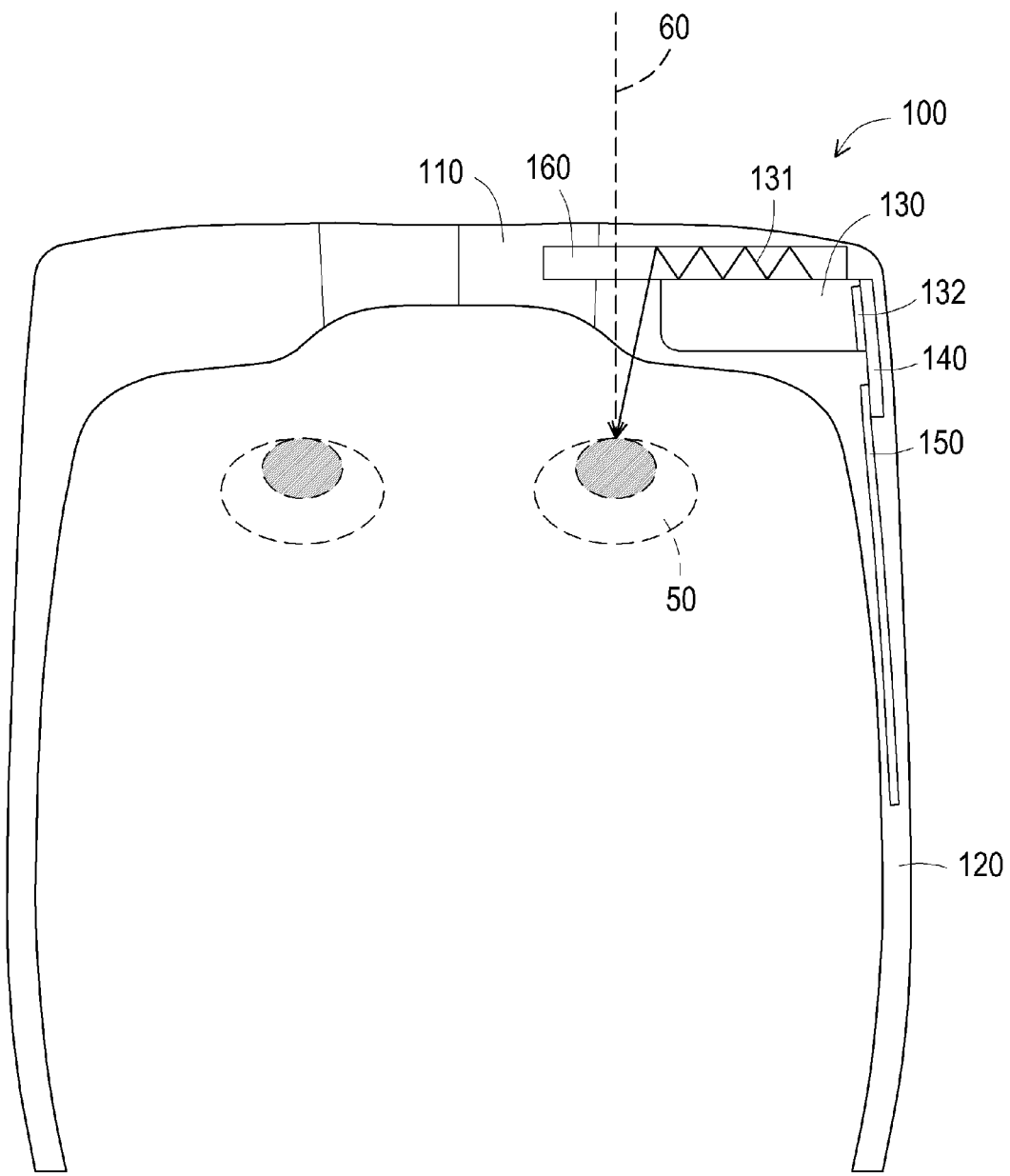
FIG. 1 is a schematic top and perspective view of a near-eye display device of an embodiment of the invention.
Figure 2A:
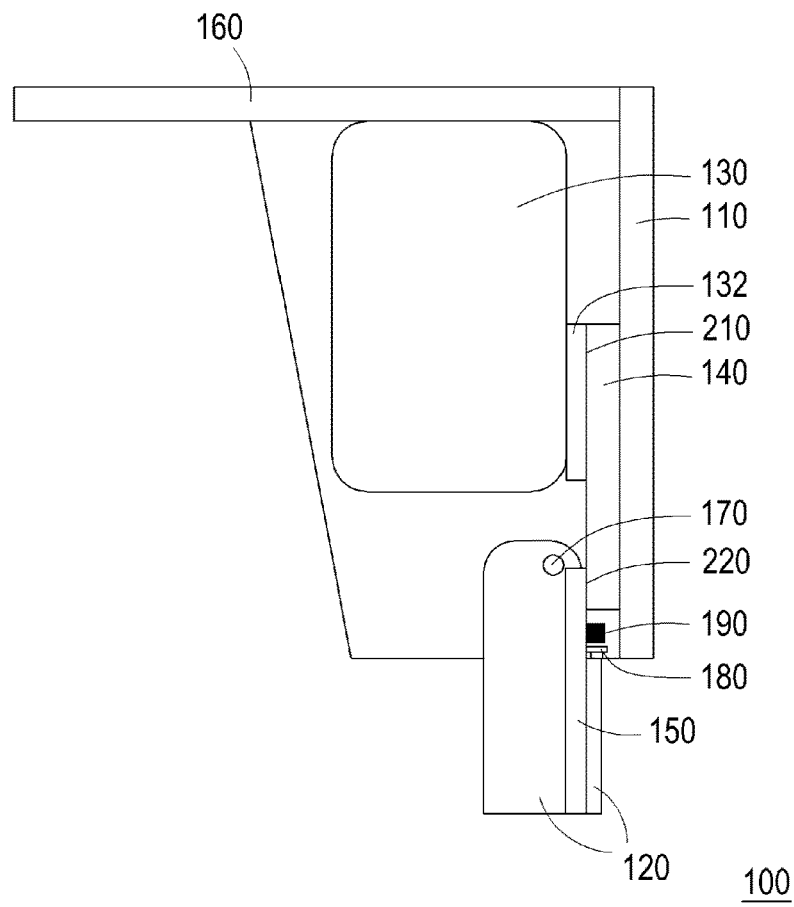
FIG. 2A is a schematic partial top and perspective view of the near-eye display device of FIG. 1 when the temple thereof is in an unfolded state.
Figure 2B:
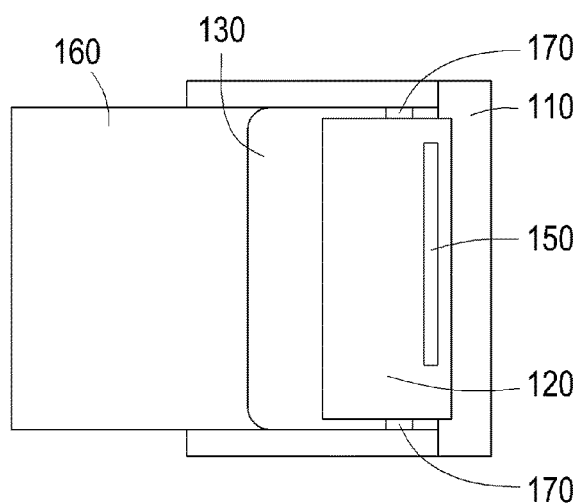
FIG. 2B is a schematic partial rear and perspective view of the near-eye display device of FIG. 1 when the temple thereof is in the unfolded state.
Figure 3A:
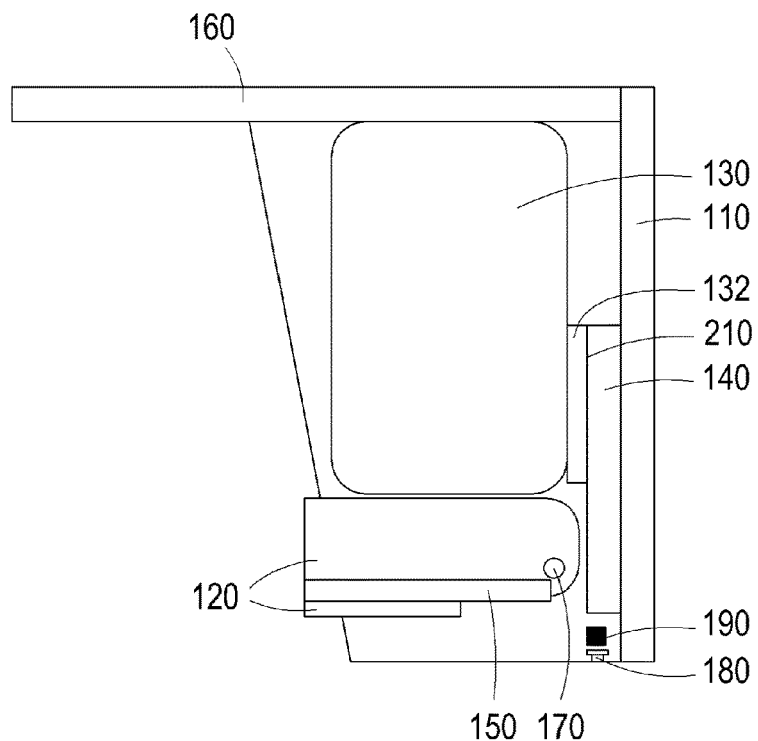
FIG. 3A is a schematic partial top and perspective view of the near-eye display device of FIG. 1 when the temple thereof is in a folded state.
Figure 3B:
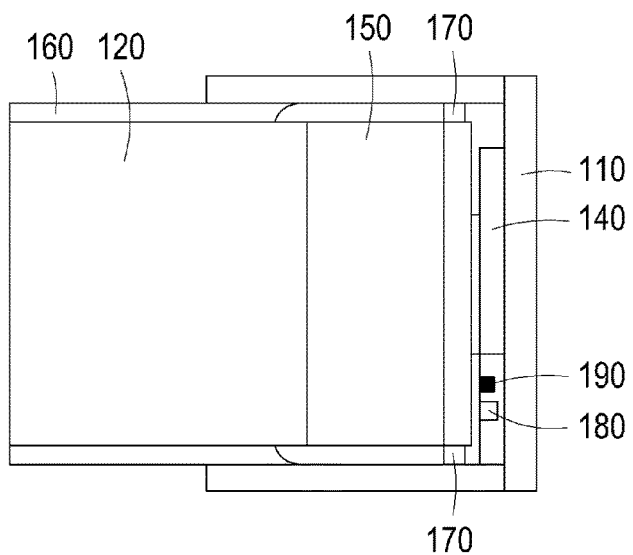
FIG. 3B is a schematic partial rear and perspective view of the near-eye display device of FIG. 1 when the temple thereof is in the folded state.

FIG. 1 is a schematic top and perspective view of a near-eye display device of an embodiment of the invention. FIG. 2A is a schematic partial top and perspective view of the near-eye display device of FIG. 1 when the temple thereof is in an unfolded state. FIG. 2B is a schematic partial rear and perspective view of the near-eye display device of FIG. 1 when the temple thereof is in the unfolded state. FIG. 3A is a schematic partial top and perspective view of the near-eye display device of FIG. 1 when the temple thereof is in a folded state. FIG. 3B is a schematic partial rear and perspective view of the near-eye display device of FIG. 1 when the temple thereof is in the folded state. Referring to FIG. 1, FIG. 2A, FIG. 2B, FIG. 3A, and FIG. 3B, a near-eye display device 100 of the embodiment includes a main frame 110, a temple 120, an optical engine module 130, a first heat transfer plate 140, and a second heat transfer plate 150. The temple 120 is pivotally connected to the main frame 110, and the optical engine module 130 is disposed in the main frame 110. In the embodiment, the optical engine module 130 includes a light source 132 and other optical elements, such as a lens, a light valve, a prism, a reflector, or any combination thereof. The first heat transfer plate 140 is disposed in the main frame 110 and connected to the optical engine module 130. In the embodiment, the light source 132 of the optical engine module 130 is in contact with the first heat transfer plate 140.

The second heat transfer plate 150 is disposed in the temple 120. The temple 120 is adapted to be rotated relative to the main frame 110 and switched between the folded state (the state shown in FIG. 3A and FIG. 3B) and the unfolded state (the state shown in FIG. 2A and FIG. 2B). When the temple 120 is in the folded state, as shown in FIG. 3A and FIG. 3B, the second heat transfer plate 150 and the first heat transfer plate 140 are separated from each other. When the temple 120 is in the unfolded state, as shown in FIG. 2A and FIG. 2B, the second heat transfer plate 150 is in contact with the first heat transfer plate 140. As a result, the heat generated by the optical engine module 130 (such as the heat generated by the light source 132, the light valve, a system chip, etc.) may be transferred to the outside via the first heat transfer plate 140 and the second heat transfer plate 150.

In the near-eye display device 100 of the embodiment, when the temple 120 is in the folded or unfolded state, the second heat transfer plate 150 is separated from or in contact with the first heat transfer plate 140. Such a design may achieve a good heat dissipation effect when the temple 120 is unfolded, and the temple 120 may be folded, with high reliability and lower production cost. The near-eye display device 100 may help dissipate heat via the second heat transfer plate 150 in the temple 120, so as to solve the issue of insufficient heat dissipation space.

In the embodiment, the near-eye display device 100 further includes a waveguide 160 disposed on the main frame 110 and configured to transmit an image beam 131 from the optical engine module 130. For example, the light valve in the optical engine module 130 may convert the illumination beam emitted by the light source 132 into the image beam 131. After the image beam 131 is transmitted in the waveguide 160, the image beam 131 is transmitted to eyes 50 of the user, so that the user may watch the image, which is a virtual image in front of the near-eye display device 100. The light source 132 includes a light-emitting diode (LED), a laser diode (LD), or a combination thereof. The light valve is, for example, a digital micro-mirror device (DMD), a liquid-crystal-on-silicon panel, or a transmissive liquid-crystal panel. In other embodiments, the optical engine module 130 may also not have a light valve, and the light source 132 itself is an image source capable of emitting the image beam 131, such as an organic light-emitting diode (OLED) display or a micro light-emitting diode (micro-LED) display.

A light 60 from an external object in the external environment may pass through the waveguide 160 to the eyes 50 of the user. In this way, the eyes 50 of the user may see the external object and the virtual image generated by the image beam 131 at the same time, so as to achieve the effect of augmented reality. In other words, the near-eye display device 100 may be an augmented reality display device. In other embodiments, the near-eye display device 100 may also be a virtual reality display device, and the eyes 50 of the user may only see the virtual image generated by the image beam 131, but may not see the external object. That is to say, the light 60 from the external object is blocked and may not be transmitted to the eyes 50 of the user.

In the embodiment, the size of the first heat transfer plate 140 is less than the size of the second heat transfer plate 150. The greater size of the second heat transfer plate 150 is more conducive to transferring the heat generated by the optical engine module 130 to the outside.

In the embodiment, the near-eye display device 100 further includes a hinge 170, wherein the temple 120 and the main frame 110 are pivotally connected by the hinge 170. In the embodiment, at least one of the first heat transfer plate 140 and the second heat transfer plate 150 is a solid heat-conducting material. The heat-conducting material may include graphite, graphite composite material, aluminum, copper, etc., for example. In other embodiments, at least one of the first heat transfer plate 140 and the second heat transfer plate 150 may also be a vapor chamber.

In the near-eye display device 100 of the embodiment, by using the design of the hinge 170, the first heat transfer plate 140 on the main frame 110 and the second heat transfer plate 150 on the temple 120 may connect to each other, and the folding of the heat transfer plate may be avoided when the temple 120 is folded, thus improving system reliability. The design of the hinge 170 and the heat dissipation system including the first heat transfer plate 140 and the second heat transfer plate 150 enable the temple 120 of the near-eye display device 100 to be folded when the near-eye display device 100 is not in use to achieve the object of easy portability. The production cost of using this heat dissipation design is lower than that of using a flexible heat dissipation material.

In the embodiment, the near-eye display device 100 further includes a switch module 180 disposed on the main frame 110 and electrically connected to the optical engine module 130. When the temple 120 is in the unfolded state, at least one of the temple 120 and the second heat transfer plate 150 (the temple 120 is taken as an example in FIG. 2A) abuts against the switch module 180. At this time, the switch module 180 is turned on, so that the optical engine module 130 is started up and in a standby state. When the temple 120 is in the folded state, at least one of the temple 120 and the second heat transfer plate 150 is separated from the switch module 180. As shown in FIG. 3A, at this moment, the switch module 180 is turned off, so that the optical engine module 130 is in an off state. That is, when the temple 120 is in the folded state, the near-eye display device 100 may not be used to prevent the user from accidentally touching the switch. In the embodiment, the switch module 180 is an interlock switch, for example, a contact switch or a magnetic induction switch.

In the embodiment, the near-eye display device 100 further includes a magnetic material 190 disposed in the main frame 110, wherein when the temple 120 is in the unfolded state, as shown in FIG. 2A, the magnetic material 190 attracts the second heat transfer plate 150 by a magnetic force. The magnetic material 190 is, for example, a magnet.

In the embodiment, the near-eye display device 100 further includes a thermal interface material 210 disposed between the optical engine module 130 and the first heat transfer plate 140, for example, disposed between the light source 132 and the first heat transfer plate 140 to facilitate heat transfer from the optical engine module 130 to the first heat transfer plate 140. The thermal interface material 210 may include thermal grease, thermal gel, thermal pad, thermal conductive adhesive, etc., for example. In other embodiments, the near-eye display device 100 may also not include the thermal interface material 210, and the light source 132 is directly in contact with the first heat transfer plate 140. In the embodiment, the near-eye display device 100 further includes a graphite thermal interface material 220 disposed on a side surface of the first heat transfer plate 140, the side surface is the surface in contact with the second heat transfer plate 150. Or, the graphite thermal interface material 220 is disposed on a side surface of the second heat transfer plate 150, and the side surface is the surface in contact with the first heat transfer plate 140. In other words, the graphite thermal interface material 220 may be disposed on the first heat transfer plate 140, or disposed on the second heat transfer plate 150, and when the temple 120 is in the unfolded state, the graphite thermal interface material 220 is disposed (sandwiched) between the first heat transfer plate 140 and the second heat transfer plate 150 to facilitate heat transfer from the first heat transfer plate 140 to the second heat transfer plate 150. The graphite thermal interface material 220 is a thermal interface material with high thermal conductivity and a thin graphite film structure. In other embodiments, the near-eye display device 100 may also not include the graphite thermal interface material 220, and the first heat transfer plate 140 is directly contact with the second heat transfer plate 150.

Figure 4A:
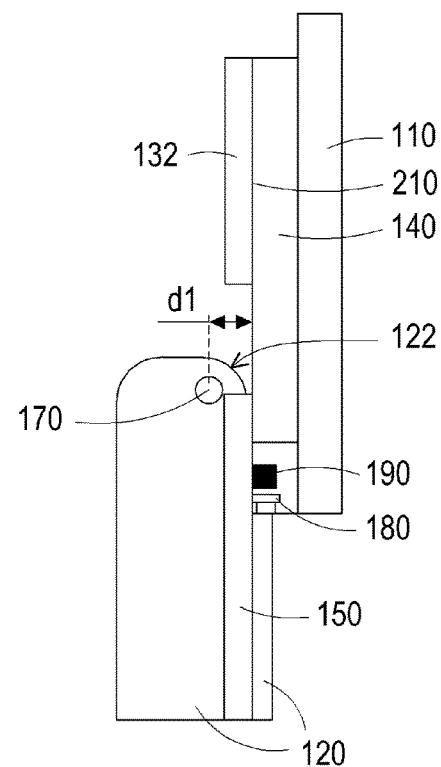
FIG. 4A is a schematic perspective view of the main frame and the temple in FIG. 2A.
Figure 4B:
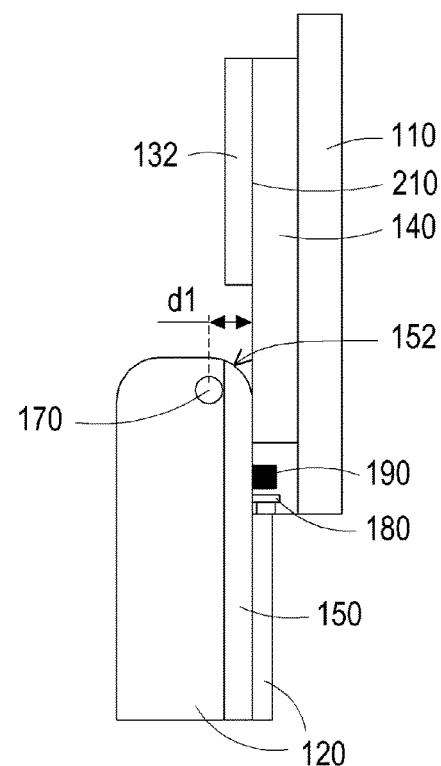
FIG. 4B is a schematic perspective view of the main frame and the temple of the second embodiment of the invention.

FIG. 4A is a schematic perspective view of the main frame and the temple in FIG. 2A, and FIG. 4B is a schematic perspective view of the main frame and the temple of the second embodiment of the invention. Please refer to FIG. 4A first, in the embodiment, the distance between a center (not marked in the figure) of the hinge 170 and the first heat transfer plate 140 is d1, an end of the temple 120 adjacent to the first heat transfer plate 140 has a rounded corner 122, a radius of the rounded corner 122 (that is, the radius of curvature) is r1 (not marked in the figure), and $r1 \geq d1$. Through the design of $r1 \geq d1$, the temple 120 may be rotated smoothly between the folded state and the unfolded state without causing the temple 120 to be interfered by the first heat transfer plate 140 when moving.

Please refer further to FIG. 4B, in the embodiment, a length of the second heat transfer plate 150 in FIG. 4B is greater than a length of the second heat transfer plate 150 in FIG. 4A. The distance between the center of the hinge 170 and the first heat transfer plate 140 is d1, an end of the temple 120 adjacent to the first heat transfer plate 140 and an end of the second heat transfer plate 150 adjacent to the first heat transfer plate 140 have a rounded corner 152, the radius of the rounded corner 152 (that is, the radius of curvature) is r1' (not marked in the figure), and $r1' \geq d1$. Through the design of $r1' \geq d1$, the temple 120 may be rotated smoothly between the folded state and the unfolded state without being stuck.

Figure 5:
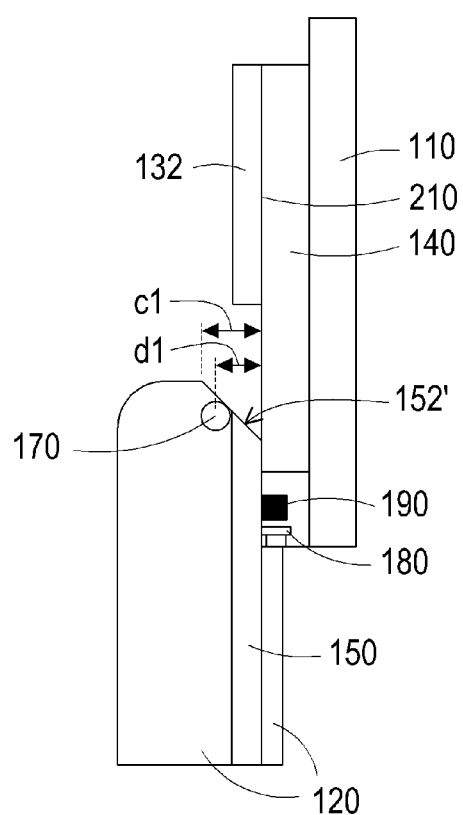
FIG. 5 is a schematic perspective view of the main frame and the temple of the third embodiment of the invention.

FIG. 5 is a schematic perspective view of the main frame and the temple of the third embodiment of the invention. Please refer to FIG. 5, in the embodiment, the distance between the center of the hinge 170 and the first heat transfer plate 140 is d1, an end of the temple 120 adjacent to the first heat transfer plate 140 and an end of the second heat transfer plate 150 adjacent to the first heat transfer plate 140 have a chamfer (e.g. a chamfer corner, a bevel angle) 152', the length of the right angle side of the chamfer 152' is c1, and $c1 \geq d1$. Through the design of $c1 \geq d1$, the temple 120 may be rotated smoothly between the folded state and the unfolded state without being stuck. In other embodiments, the rounded corner 122 in FIG. 4A may also be changed to the chamfer. That is, an end of the temple 120 adjacent to the first heat transfer plate 140 has the chamfer, and the length of the right angle side of the chamfer is c1, and c1≥d1.

Figure 6A:
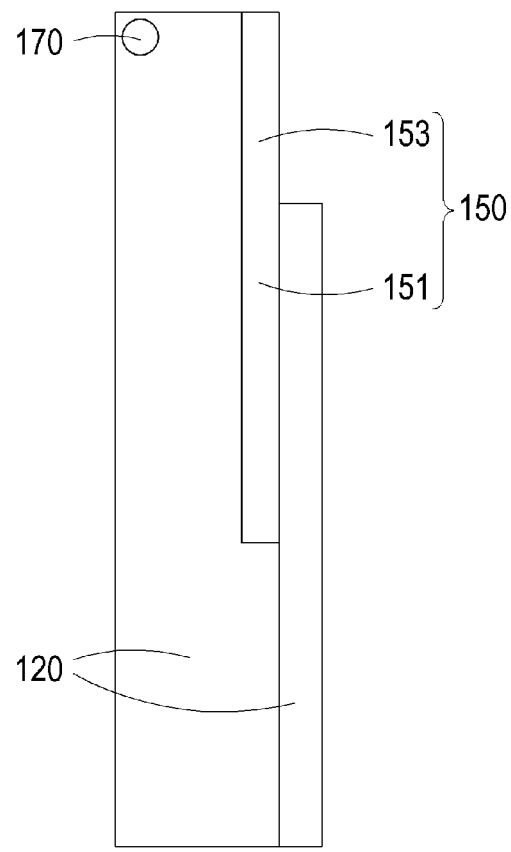
FIG. 6A is a schematic side and perspective view of the temple and the second heat transfer plate of the fourth embodiment of the invention.
Figure 6B:
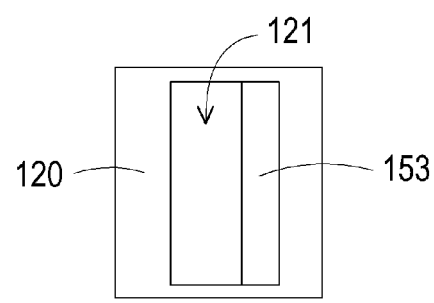
FIG. 6B is a schematic front view of the temple and the second heat transfer plate of FIG. 6A.

FIG. 6A is a schematic side and perspective view of the temple and the second heat transfer plate of the fourth embodiment of the invention, and FIG. 6B is a schematic front view of the temple and the second heat transfer plate of FIG. 6A. Please refer to FIG. 6A and FIG. 6B, in the embodiment, the temple 120 has a hollow structure, a portion 151 of the second heat transfer plate 150 is disposed in the hollow structure, and another portion 153 of the second heat transfer plate 150 is exposed to the temple 120. In other words, the temple 120 has an accommodating space 121, and the portion 151 of the second heat transfer plate 150 is located at a side of the accommodating space 121 and abuts against the inner wall of the temple 120. When the temple is in the unfolded state, the portion 153 of the second heat transfer plate 150 is in contact with the first heat transfer plate 140. In an embodiment, the second heat-conduction plate 150 may be fixed to the temple 120 by sticking or screwing.

Figure 7A:
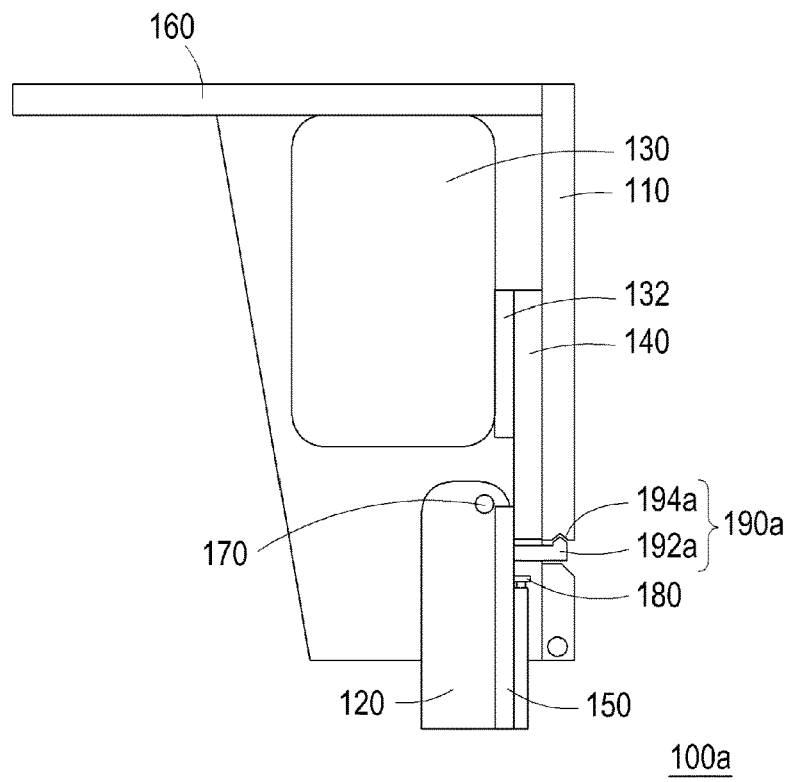
FIG. 7A is a schematic partial top and perspective view of the near-eye display device of the fifth embodiment of the invention when the temple thereof is in the unfolded state.
Figure 7B:
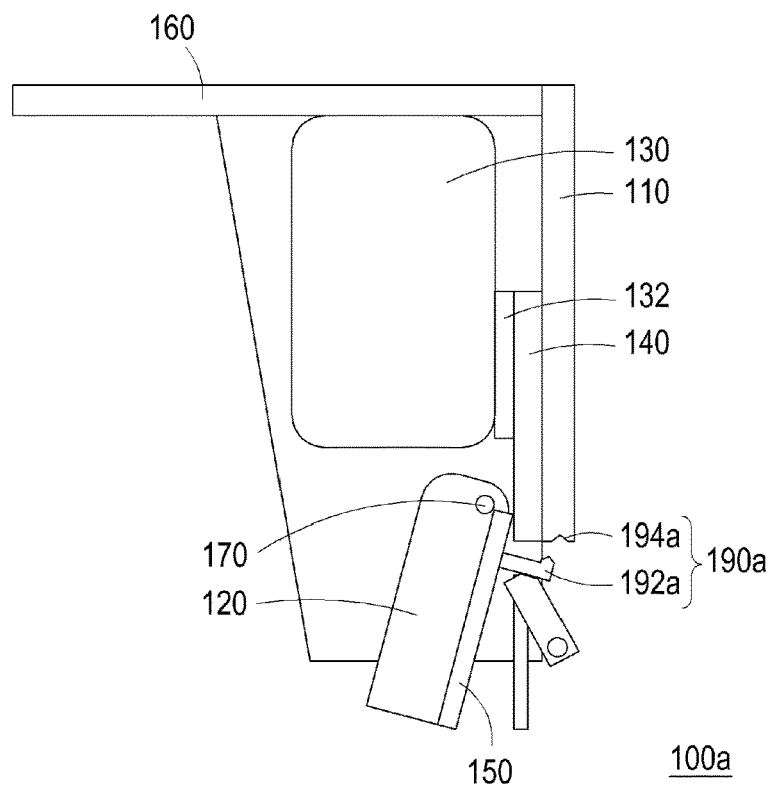
FIG. 7B is a schematic partial top and perspective view of the near-eye display device of FIG. 7A during the rotation process of the temple thereof from the unfolded state to the folded state.

FIG. 7A is a schematic partial top and perspective view of the near-eye display device of the fifth embodiment of the invention when the temple thereof is unfolded, and FIG. 7B is a schematic partial top and perspective view of the near-eye display device of FIG. 7A during the rotation process of the temple thereof from the unfolded state to the folded state. Please refer to FIG. 7A and FIG. 7B, a near-eye display device 100a of the embodiment is similar to the near-eye display device 100 of FIG. 2A, and the differences between the two are as follows. The near-eye display device 100a of the embodiment further includes a buckle device 190a, and the buckle device 190a is configured to fix the temple 120 and the main frame 110 when the temple 120 is in the unfolded state. The buckle device 190a includes a claw 192a and a buckle groove 194a, one of the claw 192a and the buckle groove 194a is located on the temple 120, and the other of the claw 192a and the buckle groove 194a is located on the main frame 110. When the temple 120 is in the unfolded state, the claw 192a is inserted into the buckle groove 194a to form a buckling and fixing effect. When the temple 120 is in the folded state, the claw 192a is separated from the buckle groove 194a. That is to say, in the embodiment, the buckle device 190a is adopted to replace the magnetic material 190 in FIG. 2A.

FIG. 8A is a schematic partial top and perspective view of the near-eye display device of the sixth embodiment of the invention when the temple thereof is unfolded, FIG. 8B is a schematic partial top and perspective view of the near-eye display device of FIG. 8A during the rotation process of the temple thereof from the unfolded state to the folded state, and FIG. 8C is a schematic partial top and perspective view of the near-eye display device of FIG. 8A when the temple thereof is in the folded state. Please refer to FIG. 8A to FIG. 8C, a near-eye display device 100b of the embodiment is similar to the near-eye display device 100 of FIG. 2A, and the differences between the two are as follows. In the near-eye display device 100b of the embodiment, a first heat transfer plate 140b is an elastic heat-conducting material. When the temple 120 is switched between the folded state and the unfolded state, the first heat transfer plate 140b is deformed and abuts against at least one of the temple 120 and the second heat transfer plate 150b. When the temple 120 is in the unfolded state, as shown in FIG. 8A, the first heat transfer plate 140b abuts against the second heat transfer plate 150b by an elastic restoring force. In the embodiment, the first heat transfer plate 140b is a U-shaped elastic sheet.

Figure 9C:
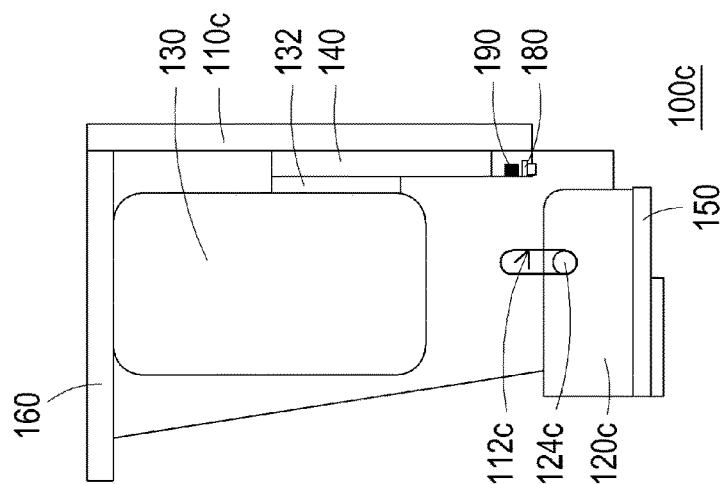
FIG. 9C is a schematic partial top and perspective view of the near-eye display device of FIG. 9A when the temple thereof is in the folded state.
Figure 9B:
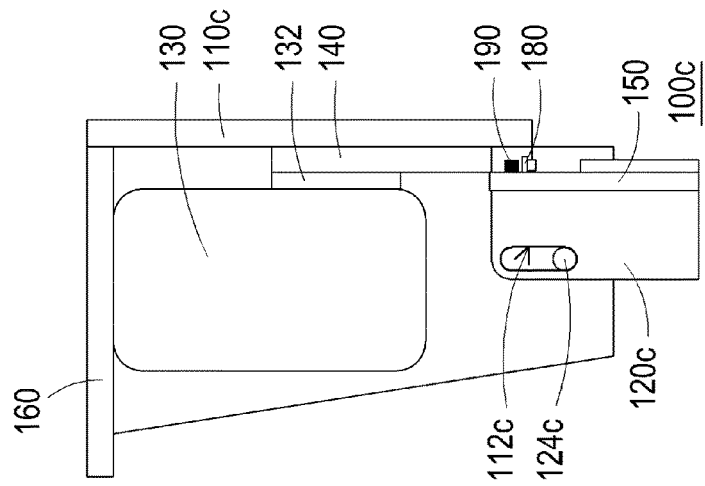
FIG. 9B is a schematic partial top and perspective view of the near-eye display device of FIG. 9A during the transition process of the temple thereof from the unfolded state to the folded state.
Figure 9A:
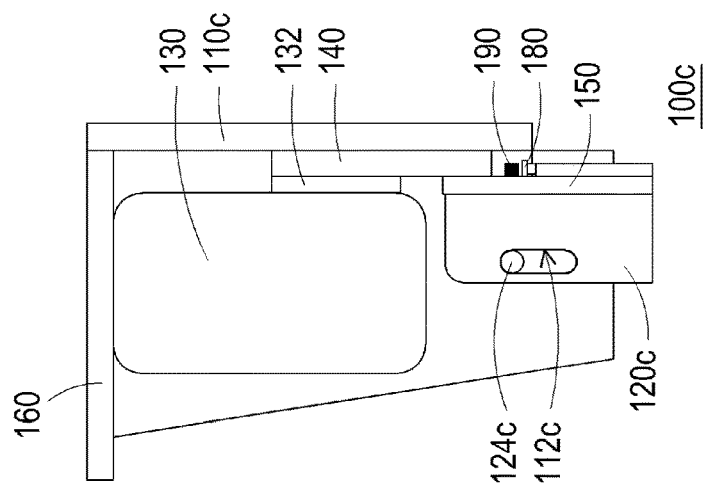
FIG. 9A is a schematic partial top and perspective view of the near-eye display device of the seventh embodiment of the invention when the temple thereof is in the unfolded state.

FIG. 9A is a schematic partial top and perspective view of the near-eye display device of the seventh embodiment of the invention when the temple thereof is unfolded, FIG. 9B is a schematic partial top and perspective view of the near-eye display device of FIG. 9A during the transition process of the temple thereof from the unfolded state to the folded state, and FIG. 9C is a schematic partial top and perspective view of the near-eye display device of FIG. 9A when the temple thereof is in the folded state. Please refer to FIG. 9A to FIG. 9C, a near-eye display device 100c of the embodiment is similar to the near-eye display device 100 of FIG. 2A, and the differences between the two are as follows. In the near-eye display device 100c of the embodiment, a main frame 110c has a slide rail 112c, a temple 120c has a rotating shaft 124c, and the rotating shaft 124c is disposed in the slide rail 112c and adapted to be rotated and slid in the slide rail 112c. When the temple 120c is changed from the unfolded state to the folded state, the temple 120c is first moved away from the optical engine module 130 by sliding the rotating shaft 124c in the slide rail 112c, and then the temple 120c is rotated relative to the main frame 110c to the folded state with the rotating shaft 124c as the center of rotation.

Figure 10:
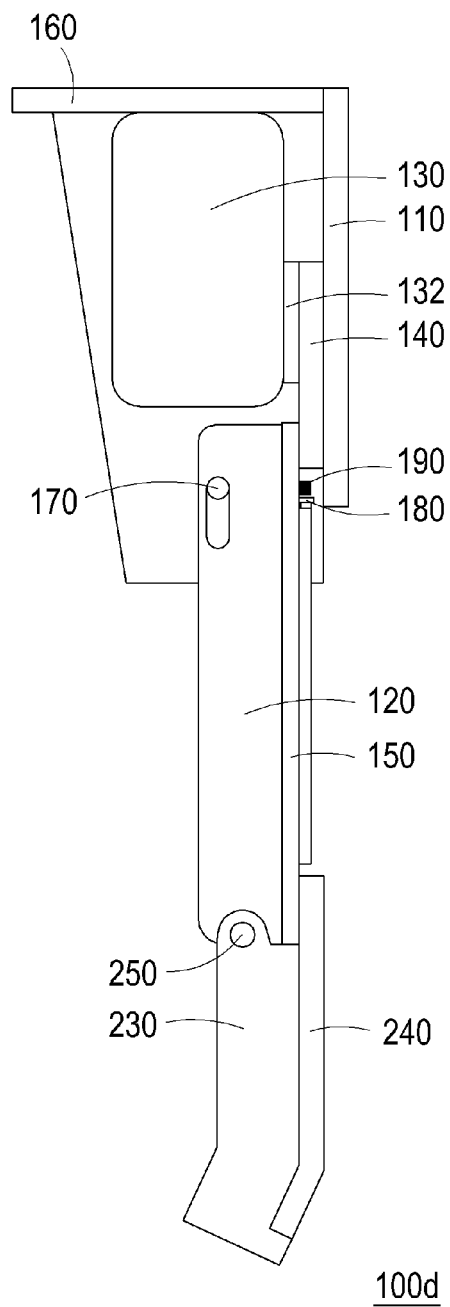
FIG. 10 is a schematic partial top and perspective view of the near-eye display device of the eighth embodiment of the invention when the temple and the extending temple thereof are in the unfolded state.

FIG. 10 is a schematic partial top and perspective view of a near-eye display device of the eighth embodiment of the invention when the temple and the extending temple thereof are in the unfolded state. Please refer to FIG. 10, a near-eye display device 100d of the embodiment is similar to the near-eye display device 100 of FIG. 2A, and the differences between the two are as follows. The near-eye display device 100d of the embodiment further includes an extending temple 230 and a third heat transfer plate 240. The extending temple 230 is pivotally connected to the temple 120, for example, pivotally connected to the temple 120 by a hinge 250. The third heat transfer plate 240 is disposed in the extending temple 230. The extending temple 230 is adapted to be rotated relative to the temple 120 and switched between the folded state and the unfolded state. When the extending temple 230 is in the folded state, the third heat transfer plate 240 and the second heat transfer plate 150 are separated from each other. When the extending temple 230 is in the unfolded state, the third heat transfer plate 240 is in contact with the second heat transfer plate 150, as shown in FIG. 10.

Based on the above, the embodiments of the invention have at least one of the following advantages or functions. In the near-eye display device of an embodiment of the invention, when the temple is in the folded or unfolded state, the second heat transfer plate is separated from or in contact with the first heat transfer plate. Such a design may achieve a good heat dissipation effect when the temple is unfolded, and the temple may be folded, with high reliability and lower costs.

The near-eye display device of an embodiment of the invention may overcome the following issues of the current near-eye display device: 1. Insufficient heat dissipation space, and the space for accommodating the heat dissipation structure is narrow; 2. If the heat dissipation structure is extended to the temple, after the temple is folded many times, it is easy to cause fatigue readily of the heat dissipation material so that heat is not readily dissipated; 3. If the heat dissipation structure is extended to the temple in order to improve heat dissipation capacity, and the temple may not be folded, then the near-eye display is not easy to carry; 4.

In order to take into account the heat dissipation structure that may be folded and extended to the temple, a flexible material is used, such as flexible thermal ground plane (TGP), etc., but the cost thereof is higher.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A near-eye display device, comprising:
a main frame;
a temple pivotally connected to the main frame;
an optical engine module disposed in the main frame;
a first heat transfer plate disposed in the main frame and connected to the optical engine module;
a second heat transfer plate disposed in the temple, and
a magnetic material disposed on the main frame,
wherein the temple is adapted to be rotated relative to the main frame and switched between a folded state and an unfolded state, when the temple is in the folded state, the second heat transfer plate and the first heat transfer plate are separated from each other, and when the temple is in the unfolded state, the second heat transfer plate is in contact with the first heat transfer plate and the magnetic material attracts the second heat transfer plate by a magnetic force.

2. The near-eye display device of claim 1, further comprising a hinge, wherein the temple and the main frame are pivotally connected by the hinge, a distance between a center of the hinge and the first heat transfer plate is d1, an end of the temple adjacent to the first heat transfer plate has a rounded corner, a radius of the rounded corner is r1, and $r1 \geq d1$.

3. The near-eye display device of claim 1, further comprising a hinge, wherein the temple and the main frame are pivotally connected by the hinge, a distance between a center of the hinge and the first heat transfer plate is d1, an end of the temple adjacent to the first heat transfer plate and an end of the second heat transfer plate adjacent to the first heat transfer plate have a rounded corner, a radius of the rounded corner is r1, and $r1 \geq d1$.

4. The near-eye display device of claim 1, further comprising a hinge, wherein the temple and the main frame are pivotally connected by the hinge, a distance between a center of the hinge and the first heat transfer plate is d1, an end of the temple adjacent to the first heat transfer plate has a chamfer, a length of a right angle side of the chamfer is c1, and $c1 \geq d1$.

5. The near-eye display device of claim 1, further comprising a hinge, wherein the temple and the main frame are pivotally connected by the hinge, a distance between a center of the hinge and the first heat transfer plate is d1, an end of the temple adjacent to the first heat transfer plate and an end of the second heat transfer plate adjacent to the first heat transfer plate have a chamfer, a length of a right angle side of the chamfer is c1, and $c1 \geq d1$.

6. The near-eye display device of claim 1, further comprising a thermal interface material disposed between the optical engine module and the first heat transfer plate.

7. The near-eye display device of claim 1, wherein the temple has a hollow structure, a portion of the second heat transfer plate is disposed in the hollow structure, and another portion of the second heat transfer plate is exposed to the temple.

8. The near-eye display device of claim 1, wherein the first heat transfer plate is an elastic heat-conducting material, when the frame is switched between the folded state and the unfolded state, the first heat transfer plate is deformed and abuts against at least one of the temple and the second heat transfer plate, and when the temple is in the unfolded state, the first heat transfer plate abuts against the second heat transfer plate by an elastic restoring force.

9. The near-eye display device of claim 8, wherein the first heat transfer plate is a U-shaped elastic sheet.

10. The near-eye display device of claim 1, further comprising a switch module disposed on the main frame and electrically connected to the optical engine module, wherein when the temple is in the unfolded state, at least one of the temple and the second heat transfer plate abuts against the switch module, and the switch module is turned on, so that the optical engine module is in a standby state, when the temple is in the folded state, at least one of the temple and the second heat transfer plate is separated from the switch module, and the switch module is turned off, so that the optical engine module is in an off state.

11. The near-eye display device of claim 10, wherein the switch module comprises a contact switch or a magnetic induction switch.

12. The near-eye display device of claim 1, further comprising a graphite thermal interface material disposed on a side surface of the first heat transfer plate, wherein the side surface is in contact with the second heat transfer plate.

13. The near-eye display device of claim 1, further comprising a graphite thermal interface material disposed on a side surface of the second heat transfer plate, wherein the side surface is in contact with the first heat transfer plate.

14. The near-eye display device of claim 1, further comprising:
   an extending temple pivotally connected to the temple; and
   a third heat transfer plate disposed in the extending temple,
   wherein the extending temple is adapted to be rotated relative to the temple and switched between the folded state and the unfolded state, when the extending temple is in the unfolded state, the third heat transfer plate and the second heat transfer plate are separated from each other, and when the extending temple is in the unfolded state, the third heat transfer plate is in contact with the second heat transfer plate.

15. The near-eye display device of claim 1, wherein the main frame has a slide rail, the temple has a rotating shaft, the rotating shaft is arranged in the slide rail and adapted to be rotated and slid in the slide rail, when the temple is changed from the unfolded state to the folded state, the temple is first moved away from the optical engine module by sliding the rotating shaft in the slide rail, and then the temple is rotated relative to the main frame to the folded state with the rotating shaft as a center of rotation.

16. The near-eye display device of claim 1, wherein the optical engine module comprises a light source, and the light source is connected to the first heat transfer plate.

17. The near-eye display device of claim 1, further comprising a waveguide disposed on the main frame and configured to transmit an image beam from the optical engine module.

18. The near-eye display device of claim 1, wherein a size of the first heat transfer plate is less than a size of the second heat transfer plate.

19. A near-eye display device, comprising:
   a main frame;
   a temple pivotally connected to the main frame;
   an optical engine module disposed in the main frame;
   a first heat transfer plate disposed in the main frame and connected to the optical engine module;
   a second heat transfer plate disposed in the temple, and
   a hinge, wherein the temple and the main frame are pivotally connected by the hinge, a perpendicular distance between a center of the hinge and the first heat transfer plate is $d1$, an end of the temple adjacent to the first heat transfer plate has a rounded corner, a radius of the rounded corner is $r1$, and $r1 \geq d1$;
   wherein the temple is adapted to be rotated relative to the main frame and switched between a folded state and an unfolded state, when the temple is in the folded state, the second heat transfer plate and the first heat transfer plate are separated from each other, and when the temple is in the unfolded state, the second heat transfer plate is in contact with the first heat transfer plate.

20. A near-eye display device, comprising:
   a main frame;
   a temple pivotally connected to the main frame;
   an optical engine module disposed in the main frame;
   a first heat transfer plate disposed in the main frame and connected to the optical engine module;
   a second heat transfer plate disposed in the temple, and
   a hinge, wherein the temple and the main frame are pivotally connected by the hinge, a perpendicular distance between a center of the hinge and the first heat transfer plate is $d1$, an end of the temple adjacent to the first heat transfer plate has a chamfer, a length of a right angle side of the chamfer is $c1$, and $c1 \geq d1$;
   wherein the temple is adapted to be rotated relative to the main frame and switched between a folded state and an unfolded state, when the temple is in the folded state, the second heat transfer plate and the first heat transfer plate are separated from each other, and when the temple is in the unfolded state, the second heat transfer plate is in contact with the first heat transfer plate.

* * * * *